3,463,841
MALATHION MANUFACTURE
Gerald Richard Backlund, Maplewood, Joseph Francis Martino, Elizabeth, and Ralph Dettmer Divine, Rahway, N.J., assignors to American Cyanamid Company, Stamford, Conn., a corporation of Maine
No Drawing. Filed Nov. 1, 1966, Ser. No. 591,115
Int. Cl. C07f 9/16; A01n 9/36
U.S. Cl. 260—978                  7 Claims

ABSTRACT OF THE DISCLOSURE

Malathion preparation which involves condensating O,O-dimethyldithiophosphoric acid with diethyl maleate, then terminating the reaction prior to its complete conversion and removing any unreacted starting materials under reduced pressure is provided.

---

The present invention relates to a novel process for the preparation of O,O-dimethyl phosphorodithioate of diethyl mercaptosuccinate of improved yield and purity.

Highly potent O,O-dimethyl phosphorodithioate of diethyl mercaptosuccinate, hereinafter termed malathion, has been an article of commerce for more than a decade. Since its appearance, satisfactory procedures have been developed for its preparation. Illustrative of such are disclosed in United States Letters Patents, Nos. 2,578,652 and 2,863,902, issued on Dec. 18, 1951, and Dec. 9, 1958, respectively. Malathion has been widely accepted as highly effective against a plethora of insects, including grasshoppers, cereal leaf beetles, mosquitoes, cotton boll weevils and corn rootworms, amongst others. As is also known, malathion possesses a very low order of mammalian toxicity, a wide margin of safety at insecticidally effective rates and a rather short residual life, thereby permitting its use on crops nearly to time of harvest. Malathion is considered one of the safest insecticides presently available. Continued, sustained effort has been expended to further improve its odor, color and stability, as evidenced, for instance, by United States Letters Patents Nos. 2,879,284, 2,962,521 and 2,980,723, issued on Mar. 4, 1959, Nov. 29, 1960 and Apr. 18, 1961, respectively. In this connection, it has been recently determined that malathion, as produced by prior art processes, contains a small amount of diethyl fumarate, usually between about 1% and 4% by weight of the technical grade material. Unfortunately, diethyl fumarate has been found to cause skin sensitization or irritation to some people. To alleviate or reduce any likelihood toward skin sensitization, it is, therefore, desirable to provide an improved malathion containing minimal amounts of diethyl fumarate. If such a process could be provided, particularly one which simultaneously increases production yield while decreasing the amount of diethyl fumarate in technical grade malathion, such a process would fill a long felt need in the art.

In accordance with the process of the invention, the aforementioned objectives are achieved in an economical and straightforward manner. There is initially reacted phosphorus pentasulfide and methanol in the presence of a suitable solvent, such as dioxane, benzene or toluene, at an elevated temperature, typically between about 170° F. and 190° F., and preferably between 175° F. and 185° F., to prepare O,O-dimethyldithiophosphoric acid. The reaction mixture comprises approximately from 60% to 65% of O,O-dimethyldithiophosphoric acid. The mixture is next reacted with diethyl maleate, usually in a mole ratio of from about 1.02 to 1.15, and preferably from 1.02 to 1.10 moles of O,O-dimethyldithiophosphoric acid to 1.0 mole of diethyl maleate. The reaction is terminated when the desired reaction product, namely, crude malathion, contains approximately between 10% and 25% of unconverted reactants. This terminal point is readily determined by intermittently analyzing the condensation or reaction mixture. Condensation reaction temperature is maintained from about 175° F. to about 225° F., and preferably between about 190° F. to about 200° F. During the initial reaction period, pressure is reduced from about 760 mm. Hg to from between about 20 mm. Hg and 30 mm. Hg. The residence time for effecting partial or incomplete reaction is approximately three hours, during which time essentially all of the solvent is stripped off and recovered.

Crude malathion reaction mixture containing between 10% and 25% of unconverted reactants is further subjected to heating at between about 250° F. and about 360° F., and preferably from about 280° F. to about 320° F., and a reduced pressure of about 1 mm. Hg to about 30 mm. Hg in a low retention time-evaporation still, such as a wiped-film or falling-film evaporator. This step is singularly critical so that most of the unconverted reactants and a small amount of malathion can be stripped off or removed from the mixture while avoiding the conversion to degradation products. The stripped overheads from the evaporator, which contain the unconverted reactants and some malathion, are then recycled to the reaction vessel for make-up with additional diethyl maleate and O,O-dimethyldithiophosphoric acid. Thereafter, the bottoms containing desired malathion are washed with an aqueous sodium carbonate solution to eliminate residual acidic impurities, water washed and, finally, steam-stripped to yield dry malathion having minimum purity of about 97% and containing less than 0.5% of diethyl fumarate.

Malathion containing less than 0.5% of diethyl fumarate can, if desired, be readily prepared from the above-recovered steam-stripped product. The latter may be treated with an aqueous solution containing sodium sulfide, sodium sulfite, potassium sulfide, potassium sulfite, ammonium sulfide or ammonium sulfite to establish a pH of at least 7, and preferably between 7.1 and 7.5. The organic phase containing malathion of less than 0.1% diethyl fumarate content is then separated from the aqueous layer.

Advantageously, the process of the invention results in a substantial increase in malathion production, usually between 10% and 20%, and a simultaneous and proportional reduction in overall operating time. Further, there is recovered about 15% to about 20% of unreacted diethyl maleate and O,O-dimethyldithiophosphoric acid along with some of malathion.

In general, the improvement in malathion production is largely attributable to the utilization of a low retention time evaporator, such as a wiped-film or falling-film evaporator. The latter provides for the accurate control of the evaporation temperature, thereby avoiding long periods of heating of crude malathion and unconverted reactants which otherwise result in degradation of product and reactants. Maintenance of the evaporation temperature at between 250° F. and 360° F. and the control of the pressure at between about 1 mm. Hg and 30 mm. Hg for a short period of time, usually not more than five minutes and preferably from about one second to about 60 seconds are sufficient to effect the stripping off of most of the unconverted reactants and volatile impurities from resultant malathion with attendant little, if any, degradation of product or unconverted reactants. If, however, the evaporation temperature is increased to about 375° F. or 380° F., or higher substantial degradation is obtained. Conversely, where the evaporation temperature is reduced to about 235° F., or lower, substantial amounts of unconverted reactants remain in the bottoms containing so-formed malathion. Washing time and costs are then increased. Unconverted reactants are usually lost and product yield as well as operating efficiency are thus adversely affected.

Advantageously, in the process of the present invention, resultant product from the low retention time evaporator contains not more than about 4% of unreacted dimethyldithiophorphoric acid. As contrasted to the prior practice which permits the condensation reaction to be carried out essentially to completion based on diethyl maleate, the product contains about three times as much O,O-dimethyldithiophosphoric acid when about 1.22 moles of O,O-dimethyldithiophosphoric acid per mole of diethyl maleate are employed.

The following examples are presented for purposes of illustration. These are not to be taken or construed as being limitative. Unless otherwise stated, the parts given are by weight.

Example 1

Into a suitable condensation vessel, 3087 parts of diethyl maleate are introduced along with vigorously agitating 1300 parts of overheads which comprise unconverted reactants of a previous run recovered from a low retention time evaporator and 4632 parts of O,O-dimethyldithiophosphoric acid as a 62% solution in toluol. When adequate admixture is obtained, the temperature of the reaction mixture in the condensation kettle is increased to 195° F. The temperature of the reaction mixture is then maintained for a three-hour holding period while the absolute pressure is reduced slowly to from about 760 mm. Hg to about 20 mm. Hg.

At the end of the three hour holding period, essentially all of the toluene is removed and recovered. The crude product is, thereafter, cooled to approximately 160° F. and then passed to a low retention time evaporator where it is heated to between 300° F. and 310° F. at 10–12 mm. Hg absolute pressure for about ten seconds. Unconverted reactants are removed in the overhead vapor from the evaporator. This overhead is condensed and recycled to the condensation kettle for make-up and reuse.

Stripped malathion from the evaporator recovered as bottoms is then treated with an aqueous solution of sodium carbonate to remove impurities and the small amount of acidic reactants which escaped stripping by evaporation. Following the carbonate treatment, the organic phase is separated from the aqueous alkaline solution. The washed malathion is subjected to a water wash and then separated therefrom. Washed malathion is finally subjected to steam stripping at 120° F. and 25 mm. Hg absolute pressure and the dry malathion, having a minimum 97% purity and containing less than 0.5% diethyl fumarate, is recovered.

Yields of malathion recovered are 94%, based on diethyl fumarate and 83%, based on phosphorus pentasulfide.

Example 2

Malathion recovered in accordance with the procedure set forth in Example 1 is treated with an aqueous solution of sodium sulfide. The organic phase is separated from the mixture, washed with water, and steam stripped to recover a dry malathion containing less than about 0.1% diethyl fumarate.

Substantially the same result is achieved in recovering malathion containing less than about 0.1% diethyl fumarate when substituting sodium sulfite, potassium sulfide, potassium sulfite, ammonium sulfide or ammonium sulfite for sodium sulfide.

Example 3

The procedure of Example 2 is followed in every detail, except that a stripping operation under a reduced pressure of about 5 mm. Hg absolute pressure and 180° F. is substituted for steam distillation per se. There is recovered a dry malathion in 94% yield, based on diethyl fumarate and 83%, based on phosphorus pentasulfide, analyzing as containing less than about 0.1% diethyl fumarate.

We claim:

1. A process for the preparation of O,O-dimethyl phosphorodithioate of diethyl mercaptosuccinate which comprises the steps of: condensing 1.0 mole of diethyl maleate with from about 1.02 to about 1.15 moles of O,O-dimethyldithiophosphoric acid while maintaining the temperature of said reaction mixture between about 175° F. to about 225° F. and reducing the pressure from about 760 mm. Hg to from between about 20 mm. Hg and 30 mm. Hg for a period of about three hours whereby conversion of from about 75% to about 90% is obtained; subjecting resultant product containing unconverted reactants to evaporation at a temperature ranging from about 250° F. to about 360° F. under a reduced pressure of from about 1 mm. Hg to about 30 mm. Hg for a time not exceeding about five minutes; removing the volatile materials including any unreacted dimethyl maleate from the product, recycling said materials to the condensation reaction; and recovering from the evaporation treatment a non-volatile malathion product of good purity and yield.

2. The method according to claim 1 wherein the product from the evaporation treatment is washed with an alkaline solution.

3. The method according to claim 1 wherein said condensation reaction is conducted in the presence of an organic solvent.

4. The method according to claim 1 wherein the temperature of evaporation is maintained between about 280° F. and 320° F. and the pressure maintained between about 1 mm. Hg and 30 mm. Hg for about ten seconds.

5. The method according to claim 1 wherein the O,O-dimethyl phosphorodithioate of diethyl mercaptosuccinate prepared by the above process is treated with an aqueous solution containing a compound selected from the group consisting of sodium sulfide, sodium sulfite, potassium sulfide, potassium sulfite, ammonium sulfide and ammonium sulfite and separating the organic phase from the aqueous phase in the thus prepared mixture.

6. The method according to claim 1 wherein the condensation product containing unconverted reactants is continuously subjected to evaporation as a film, fine stream or spray while being heated to between 280° F. and 320° F. under a reduced pressure for a period not exceeding about five seconds, separating volatile components in the condensed product, recycling the latter volatile components to the initial condensation reactor, and recovering desired non-volatile malathion of good purity and yield.

7. A continuous process according to the process of claim 1 for the preparation of O,O-dimethylphosphorodithioate of diethyl mercaptosuccinate comprising the steps of: continuously condensing in a reaction zone O,O-dimethyldithiophosphoric acid with diethyl maleate and recycle mixture containing O,O-dimethyldithiophosphoric acid, diethyl maleate and malathion; adjusting the O,O-dimethyldithiophosphoric acid to diethyl maleate mole ratio to from about 1.02 mole to 1.15 moles of O,O-dimethyldithiophosphoric acid to 1.0 mole of diethyl maleate; heating the mixture to between about 175° F. and 225° F. and under the reduced pressure from between about 20 mm. Hg and 30 mm. Hg in the presence of an inert organic solvent; continuously withdrawing the reaction mixture from the said reaction zone when said mixture contains between about 10% and 25% of unconverted reactants; continuously vacuum evaporating said heated mixture containing unconverted reactants at a pressure between 1 mm. Hg and 30 mm. Hg and a temperature of about 250° F.–360° F. in said evaporator; separating the volatile materials from said mixture; recycling said stripped mixture containing the unconverted reactants and malathion to the reaction zone, and recovering non-volatilezed malathion product of good yield and purity.

References Cited

UNITED STATES PATENTS 2,578,652  12/1951  Cassaday _____ 260—978

CHARLES B. PARKER, Primary Examiner

R. L. RAYMOND, Assistant Examiner

U.S. Cl. X.R.

260—942